US010845990B2

(12) United States Patent
Kim

(10) Patent No.: US 10,845,990 B2
(45) Date of Patent: Nov. 24, 2020

(54) METHOD FOR EXECUTING OF SECURITY KEYBOARD, APPARATUS AND SYSTEM FOR EXECUTING THE METHOD

(71) Applicant: SAMSUNG SDS CO., LTD., Seoul (KR)

(72) Inventor: Dong-Ho Kim, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 242 days.

(21) Appl. No.: 15/989,308

(22) Filed: May 25, 2018

(65) Prior Publication Data

US 2018/0341402 A1 Nov. 29, 2018

(30) Foreign Application Priority Data

May 26, 2017 (KR) .................. 10-2017-0065112

(51) Int. Cl.
*G06F 3/0488* (2013.01)
*H04L 9/32* (2006.01)
*H04L 9/08* (2006.01)

(52) U.S. Cl.
CPC .......... *G06F 3/04886* (2013.01); *H04L 9/088* (2013.01); *H04L 9/0861* (2013.01); *H04L 9/3228* (2013.01); *H04L 9/3236* (2013.01); *H04L 9/3271* (2013.01)

(58) Field of Classification Search
CPC ... G06F 3/04886; G06F 21/83; H04L 9/3271; H04L 9/088; H04L 9/0861; H04L 9/3228; H04L 9/3236
See application file for complete search history.

(56) References Cited

U.S. PATENT DOCUMENTS

| 9,131,382 | B1* | 9/2015 | Johns | H04W 12/1208 |
|---|---|---|---|---|
| 9,935,939 | B1* | 4/2018 | Wendling | H04W 12/0608 |
| 2003/0229795 | A1* | 12/2003 | Kunigkeit | G06F 21/83 |
| | | | | 713/189 |
| 2008/0288776 | A1* | 11/2008 | Kim | H04L 9/0822 |
| | | | | 713/168 |
| 2010/0138918 | A1* | 6/2010 | Kim | G06F 21/83 |
| | | | | 726/22 |
| 2010/0223475 | A1* | 9/2010 | MacFarlane | G06F 21/53 |
| | | | | 713/189 |
| 2014/0281577 | A1* | 9/2014 | Nicholes | G06F 21/71 |
| | | | | 713/189 |
| 2016/0088471 | A1* | 3/2016 | Feng | H04L 9/3226 |
| | | | | 705/71 |

(Continued)

*Primary Examiner* — Michael Pyzocha
(74) *Attorney, Agent, or Firm* — Sughrue Mion, PLLC

(57) ABSTRACT

Disclosed is a security keyboard executing method, and an apparatus and system for performing the same. A security keyboard system according to an embodiment of the present disclosure includes: a caller module configured to generate a first verification value in response to a call event for a security keyboard, and generate a security keyboard call signal which includes the first verification value and caller identification information; and a security keyboard module configured to receive the security keyboard call signal, generate a second verification value based on the security keyboard call signal, and verify a security keyboard call by comparing the first verification value and the second verification value.

20 Claims, 4 Drawing Sheets

(56) References Cited

U.S. PATENT DOCUMENTS

| | | | | |
|---|---|---|---|---|
| 2016/0191240 A1* | 6/2016 | Chuang | ................ | H04L 9/0877 380/45 |
| 2018/0349575 A1* | 12/2018 | Somsikov | ............. | G06F 15/167 |
| 2019/0044698 A1* | 2/2019 | Minner | ................ | H04L 9/0618 |

* cited by examiner

METHOD FOR EXECUTING OF SECURITY KEYBOARD, APPARATUS AND SYSTEM FOR EXECUTING THE METHOD

CROSS-REFERENCE TO RELATED APPLICATION(S)

This application claims priority from Korean Patent Application No. 10-2017-0065112, filed on May 26, 2017, in the Korean Intellectual Property Office, the entire disclosure of which is incorporated herein by reference for all purposes.

BACKGROUND

1. Field

The following description relates to a security keyboard technology.

2. Description of the Related Art

Recently, with an increasing number of users of mobile terminals, such as smartphones, tablet PCs, and the like, and widespread use of the Internet, electronic financial transactions and e-commerce are rapidly increasing. Such electronic transactions require user authentication via input of private information. However, since a malicious third party may steal and misuse such personal information which is input through a keyboard, it is required to protect the personal information.

There is a general method of protecting private information by displaying a security keyboard (virtual keyboard) on a screen for an electronic financial transaction and receiving a user's private information via the security keyboard. However, the method has a drawback in that a malicious third party may call a security keyboard to steal personal information. Thus, there is a need for a method of preventing theft of personal information.

SUMMARY

Provided is a security keyboard executing method to provide a security keyboard by responding to a legitimate caller, and an apparatus and system for performing the same.

In accordance with an aspect of the present disclosure, there is provided a security keyboard system, including: a caller module configured to: generate a first verification value in response to a call event for a security keyboard, and generate a security keyboard call signal which includes the first verification value and caller identification information; and a security keyboard module configured to: receive the security keyboard call signal, generate a second verification value based on the security keyboard call signal, and verify a security keyboard call by comparing the first verification value and the second verification value.

The caller module and the security keyboard module may be further configured to respectively generate the first verification value and the second verification value according to an algorithm mutually agreed upon between the caller module and the security keyboard module.

The first verification value may be generated differently every time the call event occurs, and may be generated based on a previous first verification value generated based on a preceding call event; and the second verification value may be generated differently every time the security keyboard call occurs, and may be generated based on a previous second verification value generated based on a preceding security keyboard call occurs.

The caller module may be further configured to generate the first verification value based on a first count of occurrences of the call event; and the security keyboard module may be further configured to generate the second verification value based on a second count of occurrences of the security keyboard call.

The caller module may be further configured to insert a first hash value of the first verification value in the security keyboard call signal; and the security keyboard module may be further configured to generate a second hash value of the second verification value, and verify the security keyboard call by comparing the first hash value and the second hash value.

The caller module may be further configured to generate a one-time encryption key used for the call event when the call event occurs, and insert the one-time encryption key in the security keyboard call signal; and the security keyboard module may be further configured to, in response to a successful verification of the security keyboard call: generate the security keyboard, encrypt the security keyboard by using the one-time encryption key, and transmit the encrypted security keyboard to the caller module.

In accordance with another aspect of the present disclosure, there is provided a security keyboard executing method performed by a computing device which includes at least one processor, and a memory which stores at least one program executed by the at least one processor, the method including: determining whether a call event for a security keyboard has occurred; in response to the call event, generating a first verification value according to a predetermined algorithm; and generating a security keyboard call signal which includes the first verification value and caller identification information, wherein the first verification value is for verifying a security keyboard call.

The security keyboard executing method may further include, after generating the security keyboard call signal: generating a second verification value based on the security keyboard call signal; and verifying the security keyboard call by comparing the first verification value and the second verification value.

The first verification value may be generated differently every time the call event occurs, and may be generated based on a previous first verification value generated based on a preceding call event; and the second verification value may be generated differently every time the security keyboard call occurs, and may be generated based on a previous second verification value generated based on a preceding security keyboard call.

The first verification value may be generated based on a first count of occurrences of the call event; and the second verification value may be generated based on a second count of occurrences of the security keyboard call.

The generating the first verification value may include generating a first hash value of the first verification value, the first hash value of the first verification value being included in the security keyboard call signal; and the verifying the security keyboard call may include generating a second hash value of the second verification value, and verifying the security keyboard call by comparing the first hash value and the second hash value of the second verification value.

In accordance with yet another aspect of the present disclosure, there is provided a security keyboard executing method performed by a computing device which includes at least one processor, and a memory which stores at least one program executed by the at least one processor, the method including: receiving a security keyboard call signal which includes a first verification value generated in response to a call event for a security keyboard, and caller identification information; generating a second verification value based on the security keyboard call signal; and verifying a security keyboard call by comparing the first verification value and the second verification value.

The first verification value may be generated differently every time the call event occurs, and may be generated based on a previous first verification value generated based on a preceding call event; and the second verification value may be generated differently every time the security keyboard call occurs, and may be generated based on a previous second verification value generated based on a preceding security keyboard call.

The first verification value may be generated based on a first count of occurrences of the call event; and the second verification value may be generated based on a second count of occurrences of the security keyboard call.

The security keyboard call signal may include a first hash value of the first verification value; and the verifying the security keyboard call may include generating a second hash value of the second verification value, and verifying the security keyboard call by comparing the first hash value and the second hash value.

The security keyboard call signal may include a one-time encryption key used for the call event when the call event occurs, and wherein the security keyboard executing method may further include: in response to a successful verification of the security keyboard call, generating the security keyboard, encrypting the security keyboard by using the one-time encryption key, and transmitting the encrypted security keyboard in response to the security keyboard call signal.

In accordance with still another aspect of the present disclosure, there is provided a computing device, including: at least one processor; a memory; and at least one program stored in the memory and executed by the at least one processor, wherein the at least one program may include: a verification value generator configured to generate a first verification value in response to a call event for a security keyboard; and a caller configured to generate a security keyboard call signal which includes the first verification value and caller identification information, wherein the first verification value is for verifying a security keyboard call.

The verification value generator may be further configured to generate the first verification value differently every time the call event occurs, and generate the first verification value based on a previous first verification value generated based on a preceding call event.

The verification value generator may be further configured to generate the first verification value based on a count of occurrences of the call event.

The computing device may further include an encryption key generator configured to generate a one-time encryption key used for the call event when the call event occurs, and the caller may be further configured to insert the one-time encryption key in the security keyboard call signal.

In accordance with yet another aspect of the present disclosure, there is provided a computing device, including: at least one processor; a memory; and at least one program stored in the memory and is executed by the at least one processor, wherein the at least one program may include: a call verifier configured to: receive a security keyboard call signal which includes a first verification value generated in response a call event for a security keyboard, and caller identification information, generate a second verification value based on the security keyboard call signal, and verify a security keyboard call by comparing the first verification value and the second verification value; and a security keyboard generator configured to, in response to a successful verification of the security keyboard call generate the security keyboard and transmit generated security keyboard to a transmitter of the security keyboard call signal.

The first verification value may be generated differently every time the call event occurs, and may be generated based on a previous first verification value generated based on a preceding call event occurs; and the second verification value may be generated differently every time the security keyboard call occurs, and may be generated based on a second previous verification value generated based on a preceding security keyboard call.

The first verification value may be generated based on a first count of occurrences of the call event; and the second verification value may be generated based on a second count of the security keyboard call.

The security keyboard call signal may include a first hash value of the first verification value; and the call verifier may be further configured to generate a second hash value of the second verification value, and verify the security keyboard call by comparing the first hash value and the second hash value.

The security keyboard call signal may include a one-time encryption key used for the call event when the call event occurs, and wherein the security keyboard generator may be further configured to encrypt the security keyboard by using the one-time encryption key, and transmit the encrypted security keyboard to the transmitter of the security keyboard call signal.

DETAILED DESCRIPTION

Hereinafter, embodiments of the present disclosure will be described in detail with reference to the accompanying drawings. The following detailed description is provided for comprehensive understanding of a method, an apparatus, and/or a system described herein. However, it is merely exemplary and the present disclosure is not limited thereto.

In the following description, a detailed description of known functions and configurations incorporated herein will be omitted when it may obscure the subject matter of the present disclosure. Further, the terms used throughout this specification are defined in consideration of the functions of the present disclosure, and can be varied according to a purpose of a user or manager, or precedent and so on. Therefore, definitions of the terms should be made on the basis of the overall context. It should be understood that the terms used herein should be considered in a description sense only and not for purposes of limitation. Any references to singular may include plural unless expressly stated otherwise. In the present specification, it should be understood that the terms, such as 'including' or 'having,' etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In the following description, "transmission", "communication", "sending", and "reception" of a signal or information and other similar terms include not only direct transmission from a component to another component but also transmission via another component. Particularly, "transmission" or "sending" of a signal or information to a component designates a final destination of the signal or information and does not mean a direction destination. The same applies to "reception" of a signal or information. Furthermore, in this specification, when two or more data or information items are "related", this means that when one data (or information) item is obtained, at least a portion of other data (or information) item can be obtained based thereon.

It will be understood that, although the terms first, second, etc. may be used herein to describe various elements, these elements should not be limited by these terms. These terms are only used to distinguish one element from another. For example, a first component can be referred to as a second component, and likewise a second component can be referred to as a first component, without departing from the scope of the invention.

Figure 1:
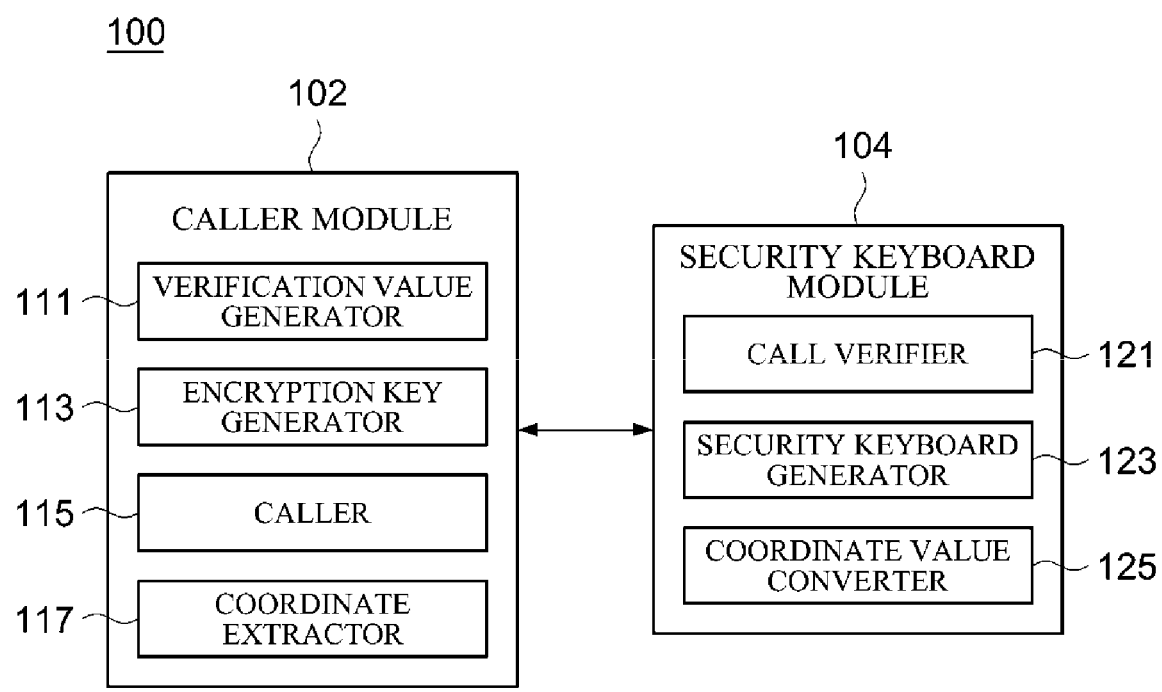
FIG. 1 is a block diagram illustrating a configuration of a security keyboard system according to an embodiment of the present disclosure.

FIG. 1 is a block diagram illustrating a configuration of a security keyboard system according to an embodiment of the present disclosure.

Referring to FIG. 1, the security keyboard system 100 includes a caller module 102 and a security keyboard module 104. In the exemplary embodiment, the security keyboard system 100 may be a mobile device, such as a smartphone, a tablet PC, a laptop computer, and a wearable device (e.g., smart watch, etc.). However, the security keyboard system 100 is not limited thereto, and may be various computing devices, such as a desktop computer and the like, in addition to a mobile terminal.

The security keyboard system 100 may be a computing device for preventing hacking of private information (e.g., credit card password, Internet banking password, etc.) when the security keyboard system 100 receives such private information from a user. That is, the security keyboard system 100 may receive private information from a user by executing a security keyboard separately from a general keyboard, and by displaying the security keyboard on a screen. To this end, the security keyboard system 100 may include an input device (e.g., keypad, touchpad, etc.) and a display device (e.g., LED display, LCD, etc.).

The caller module 102 calls the security keyboard when a call event occurs. Here, the call event may refer to an event which requires a user input through the security keyboard. For example, in the case where a user makes payment on the internet with a credit card in the security keyboard system 100, a call event may occur when the user enters a credit card password. In this case, the caller module 102 may be implemented in a payment application installed in the security keyboard system 100. Further, in the case where a user accesses an Internet banking (e.g., account transfer, etc.), a call event may occur when the user enters an internet banking password. In this case, the caller module 102 may be implemented in a bank application installed in the security keyboard system 100. However, the caller module 102 is not limited thereto, and may be implemented in an operating system or a processor of the security keyboard system 100.

The caller module 102 includes a verification value generator 111, an encryption key generator 113, a caller 115, and a coordinate extractor 117.

The verification value generator 111 may generate a verification value in response to occurrence of a call event. When a call event occurs, the verification value generator 111 may generate a verification value according to a predetermined algorithm. Specifically, when a call event occurs, the verification value generator 111 may generate a verification value according to an algorithm which is mutually agreed with a security keyboard module 104. Further, the verification value generator 111 may generate a hash value of the verification value, which is generated according to the predetermined algorithm, by hashing the generated verification value.

Here, the verification value may be generated based on a number of occurrences of call events. The verification value may be generated proportional to the number of occurrences of call events. The verification value may be generated based on a verification value generated when a preceding call event occurs. In the exemplary embodiment, the verification value may be a value counted every time a call event occurs. In this case, a verification value generated when an nth call event occurs is a value increased by one from a verification value generated when an n−1th call event occurs. The security keyboard module 104 may use the verification value to verify whether a security keyboard call is made by a legitimate caller.

The encryption key generator 113 may generate a One Time Challenge (OTC) value. In the exemplary embodiment, the encryption key generator 113 may generate an OTC value when a call event occurs. The OTC value may be a one-time encryption key used only for a corresponding call event. That is, the encryption key generator 113 may generate different OTC values every time a call event occurs.

When a call event occurs, the caller 115 may transmit a security keyboard call signal to the security keyboard module 104. The security keyboard call signal may include caller identification information (e.g., ID of the caller module 102, etc.), a verification value (or a hash value of the verification value), and an OTC value.

The coordinate extractor 117 may extract coordinates of each keypad selected by a user from the called security keyboard. The coordinate extractor 117 may display the called security keyboard on a screen. In the exemplary embodiment, the coordinate extractor 117 may encrypt the extracted coordinates of a keypad by using an OTC value, and may transmit the encrypted coordinates to the security keyboard module 104. Every time a user selects a keypad from the called security keyboard and enters private information, the coordinate extractor 117 may extract and encrypt coordinates of the selected keypad and may transmit the encrypted coordinates to the security keyboard module 104. However, the coordinate extractor 117 is not limited thereto, and once a user enters all the private information using the called security keyboard, the coordinate extractor 117 may encrypt the coordinates of the keypads and may transmit the encrypted coordinates all at once.

The security keyboard module 104 may transmit a security keyboard to the caller module 102 according to a security keyboard call signal. The security keyboard module 104 includes a call verifier 121, a security keyboard generator 123, and a coordinate value converter 125.

In response to receiving a security keyboard call signal from an external source, the call verifier 121 may verify whether the security keyboard call is received from a legitimate caller. More specifically, in response to receiving a security keyboard call signal from the caller module 102, the call verifier 121 may extract caller identification information included in the security keyboard call signal. The call verifier 121 may generate a verification value according to an algorithm which is set corresponding to the extracted caller identification information. The set algorithm may be used to generate a verification value based on a number of security keyboard calls. That is, the caller module 102 may generate a verification value based on a number of occurrences of call events, and the security keyboard module 104 may generate a verification value based on the number of security keyboard calls. In the exemplary embodiment, the set algorithm may be used to generate a verification value by counting the number of security keyboard calls.

The call verifier 121 may compare the generated verification value with a verification value included in the security keyboard call signal. That is, the call verifier 121 may check whether the verification value (hereinafter referred to as a first verification value) included in the security keyboard call signal is equal to a verification value (hereinafter referred to as a second verification value) generated by the call verifier 121. In the case where the first verification value (e.g., a count value obtained by counting a number of occurrences of call events) is equal to the second verification value (e.g., a count value obtained by counting a number of security keyboard calls), the call verifier 121 may determine that verification of a security keyboard call succeeds (i.e., determine that the security keyboard call signal is received from a legitimate caller). By contrast, in the case where the first verification value is not equal to the second verification value, the call verifier 121 may determine that verification of the security keyboard call fails. In this case, the call verifier 121 may output a message, indicating that the verification has failed, to a caller module which has transmitted the security keyboard call signal.

In the case where the security keyboard call signal includes a hash value of a verification value, the call verifier 121 may generate a verification value according to a predetermined algorithm and may generate a hash value of the verification value by hashing the generated verification value. The call verifier 121 may compare a hash value (hereinafter referred to as a first verification hash value) of the verification value included in the security keyboard call signal with a hash value (hereinafter referred to as a second verification hash value) of the generated verification value. In this case, the caller module 102 and the security keyboard module 104 may generate a hash value of each verification value based on the same hash function.

In response to determination by the call verifier 121 that verification of a security keyboard call succeeds, the security keyboard generator 123 may generate a security keyboard. The security keyboard may be a virtual keyboard, which is used for entering private information, and is provided separately from a keyboard generally used in the security keyboard system 100. Every time the verification of a security keyboard call succeeds, the security keyboard generator 123 may generate a security keyboard by randomly arranging numbers, characters, special characters, and the like which are included in the security keyboard. The security keyboard may be generated by using various known techniques.

The security keyboard generator 123 may encrypt the generated security keyboard and may transmit the encrypted security keyboard to the caller module 102. In the exemplary embodiment, the security keyboard generator 123 may encrypt the generated security keyboard by using an OTC value included in the security keyboard call signal.

The coordinate value converter 125 may receive a coordinate value of at least one keypad, selected by a user, from the caller module 102. The coordinate value converter 125 may convert the coordinate value of each keypad, received from the caller module 102, into a keypad data of a security keyboard which corresponds to the coordinate value.

More specifically, the coordinate value converter 125 may extract a keypad, having a coordinate value corresponding to the coordinate value of a keypad which is received from the caller module 102, from the security keyboard. Then, by extracting numbers, characters, or special characters, and the like which correspond to the extracted keypad, the coordinate value converter 125 may convert the coordinate value of the keypad, which is received from the caller module 102, into a keypad data of the security keyboard which corresponds to the coordinate value. By converting the coordinate values of the keypad, which are received from the caller module 102, into the keypad data of the security keyboard, the coordinate value converter 125 may obtain private information input by a user. The security keyboard module 104 may transmit the private information, input by a user, to an external server.

In the exemplary embodiment, the caller module 102 may include a verification value in a security keyboard call signal and the security keyboard module 104 may verify a security keyboard call by comparing a verification value generated by the security keyboard module 104 with a verification value included in the security keyboard call signal. In this manner, a security keyboard may be provided by responding only to a call from a legitimate caller module 102 registered in the security keyboard system 100, thereby protecting a user's private information input through the security keyboard from hackers or a third party who attempts to steal the personal information for malicious purposes, and thus improving security when a security keyboard is used.

The security keyboard system 100 may include hardware resources and/or software necessary to embody the technical spirit of the disclosed embodiments, but does not necessarily mean a single physical element or a single device. That is, the security keyboard system 100 may mean a logical combination of hardware and/or software provided to embody the technical spirit of the disclosed embodiments. Furthermore, in this specification, a module may mean a functional or structural combination of hardware for implementing the technical spirit of the embodiments of the present disclosure and software for driving the hardware. That is, the module may refer to a logical unit of specific code and hardware resources for executing the specific code is performed. Those skilled in the art will readily understand that the module is not necessarily a physically connected code or one type of hardware.

Figure 2:
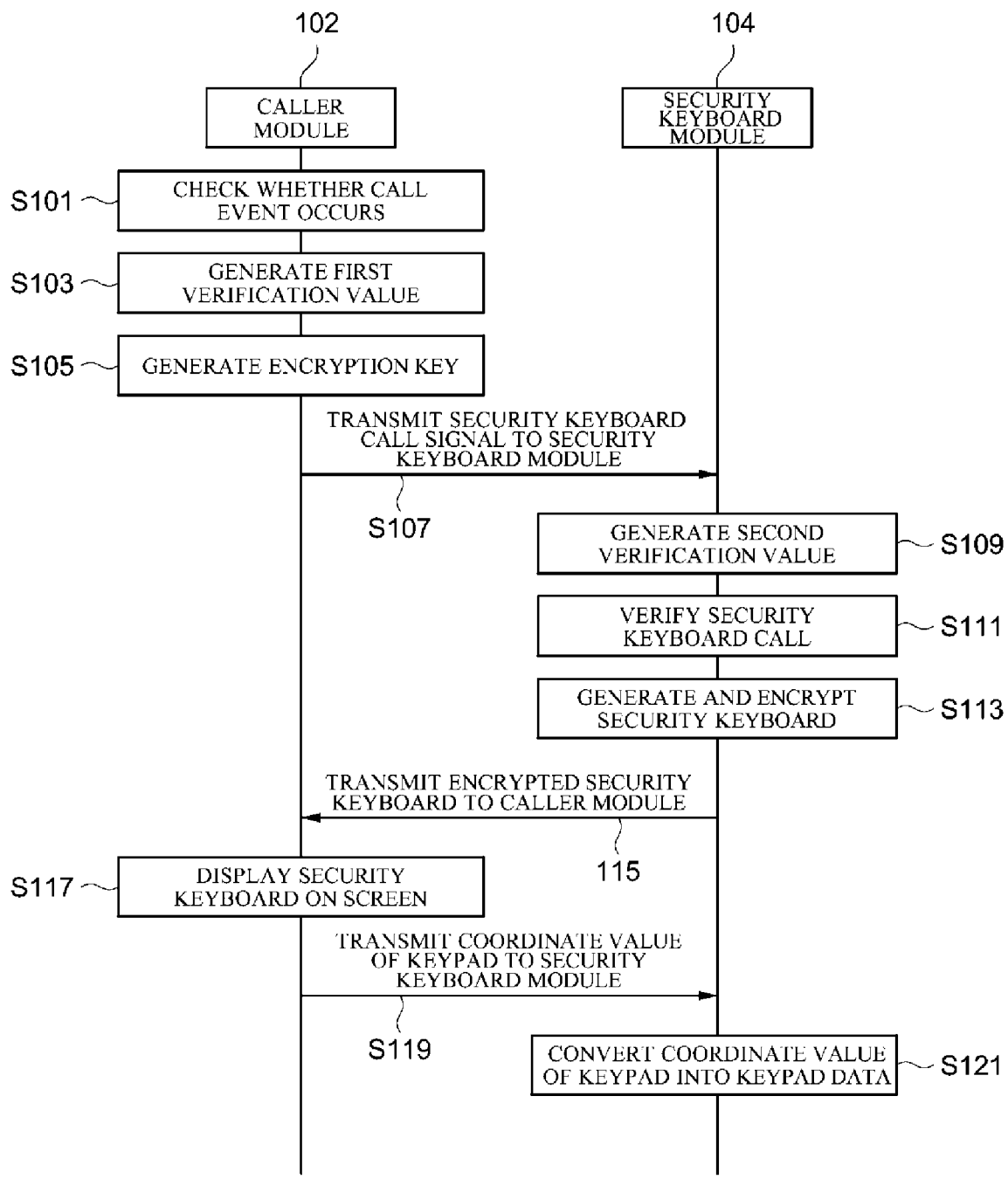
FIG. 2 is a flowchart explaining a security keyboard executing method according to an embodiment of the present disclosure.

FIG. 2 is a flowchart explaining a security keyboard executing method according to an embodiment of the present disclosure. While the flowchart illustrated in FIG. 2 shows that the method is divided into a plurality of operations, at least some of the operations may be performed in different order, may be combined to be performed concurrently, may be omitted, may be performed in sub-operations, or one or more operations not shown in the drawing may be added and performed.

Referring to FIG. 2, the caller module 102 may check whether a call event occurs in S101. That is, the caller module 102 may check whether an event occurs, which requires a user input through a security keyboard, in addition to a general keyboard. For example, in the case of requirement for input of a Personal Identification Number (PIN) for user authentication by using PIN authentication, or in the case of requirement for input of a password for user authentication by using a certificate, the caller module 102 may determine that a call event occurs.

Upon checking in S101, in response to occurrence of a call event, the caller module 102 may generate a first verification value according to a predetermined algorithm in S103. The caller module 102 may generate the first verification value based on a number of occurrences of call events. In the exemplary embodiment, the caller module 102 may determine a value, obtained by counting the number of occurrences of call events, to be the first verification value.

Then, the caller module 102 may generate an OTC value in S105. That is, the caller module 102 may generate the OTC value which is a one-time encryption key used only for a corresponding call event.

Subsequently, the caller module 102 may transmit a security keyboard call signal to the security keyboard module 104 in S107. The security keyboard call signal may include caller identification information (e.g., ID of the caller module 102, etc.), a first verification value (or a hash value of the first verification value), and an OTC value.

Next, the security keyboard module 104 may generate a second verification value based on the security keyboard call signal in S109. The security keyboard module 104 may extract the caller identification information included in the security keyboard call signal, and may generate the second verification value according to an algorithm which is set corresponding to the extracted caller identification information. The security keyboard module 104 may generate the second verification value based on the number of security keyboard calls made by the caller module 102 corresponding to the extracted caller identification information. In the exemplary embodiment, the security keyboard module 104 may determine a value, obtained by counting the number of security keyboard calls, to be the second verification value.

Then, the security keyboard module 104 may verify the security keyboard call by comparing the first verification value with the second verification value in S111. In response to the first verification value being equal to the second verification value, the security keyboard module 104 may determine that verification of the security keyboard call succeeds. In response to the first verification value not being equal to the second verification value, the security keyboard module 104 may determine that verification of the security keyboard call fails.

Upon verification in S111, in response to success in the verification of the security keyboard call, the security keyboard module 104 may generate a security keyboard and may encrypt the generated security keyboard in S113. The security keyboard module 104 may encrypt the generated security keyboard by using an OTC value included in the security keyboard call signal.

Next, the security keyboard module 104 may transmit the encrypted security keyboard to the caller module 102 in S115. Then, the caller module 102 may decrypt the security keyboard based on the OTC value, and may display the decrypted security keyboard on a screen in S117. That is, the security keyboard is encrypted by using the OTC value generated by the caller module 102, such that the caller module 102 may decrypt the security keyboard based on the OTC value.

Subsequently, the caller module 102 may extract a coordinate value of a keypad selected by a user from the security keyboard, and may transmit the extracted coordinate value to the security keyboard module 104 in S119. A user may select a keypad by touching or clicking the keypad with a mouse and the like from the security keyboard displayed on a screen. The caller module 102 may encrypt the coordinate value of the keypad selected by a user, and may transmit the encrypted coordinate value to the security keyboard module 104. For example, the caller module 102 may encrypt the coordinate value of the keypad by using the OTC value generated in S105.

Then, the security keyboard module 104 may convert the coordinate value of each keypad, which is received from the caller module 102, into a keypad data of the security keyboard which corresponds to the coordinate value in S121.

Figure 3:
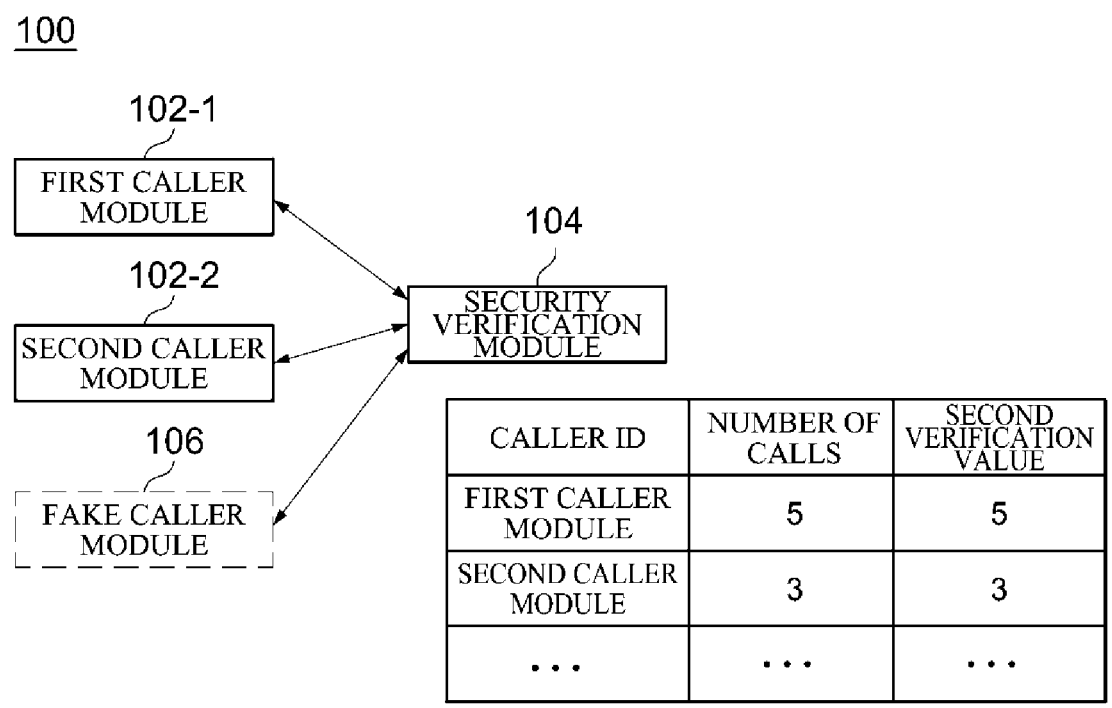
FIG. 3 is a diagram explaining an example of preventing a security keyboard from being called by a fake caller module in a security keyboard system according to an embodiment of the present disclosure.

FIG. 3 is a diagram explaining an example of preventing a security keyboard from being called by a fake caller module in a security keyboard system according to an embodiment of the present disclosure.

Referring to FIG. 3, the security keyboard system 100 includes a first caller module 102-1, a second caller module 102-2, and a security keyboard module 104. The first caller module 102-1 and the second caller module 102-2 may be legitimate callers. In the exemplary embodiment, the first caller module 102-1 and the second caller module 102-2 each may generate, as a first verification value, a count value obtained by counting a number of occurrences of call events. Further, the security keyboard module 104 may generate, as a second verification value, a count value obtained by counting a number of security keyboard calls made by each of the caller modules 102-1 and 102-2.

For example, in the case where a call event occurs for a fifth time in the first caller module 102-1, and when the last call event (i.e., a fifth call event) occurs, the first caller module 102-1 may generate, as a first verification value, a value (i.e., 5) which is increased by 1 from a count value (i.e., 4) generated when a preceding call event occurs. The first caller module 102-1 may transmit the security keyboard call signal, including the first verification value, to the security keyboard module 104. Then, the security keyboard module 104 may generate, as a second verification value, a value (i.e., 5) which is increased by 1 from a second verification value (i.e., 4) generated based on a preceding number (i.e., 4) of security keyboard calls of the first caller module 102-1, and then may check whether the first verification value is equal to the second verification value.

Further, in the case where a call event occurs for a third time in the second caller module 102-2, and when the last call event (i.e., a third call event) occurs, the second caller module 102-2 may generate, as a first verification value, a value (i.e., 3) which is increased by 1 from a count value (i.e., 2) generated when a preceding call event occurs. The second caller module 102-2 may transmit the security keyboard call signal, including the first verification value, to the security keyboard module 104. Then, the security keyboard module 104 may generate, as a second verification value, a value (i.e., 3) which is increased by 1 from a second verification value (i.e., 2) generated based on a preceding number (i.e., 2) of security keyboard calls of the second caller module 102-2, and then may check whether the first verification value is equal to the second verification value.

It is assumed that a fake caller module 106 is formed in the security keyboard system 100 by a malicious third party to steal private information of a user. In the exemplary embodiment, the fake caller module 106 may be formed by illegally duplicating the second caller module 102-2.

Here, the fake caller module 106 may randomly generate a security keyboard call signal and may transmit the generated security keyboard call signal to the security keyboard module 104. The fake caller module 106 may include a first verification value (i.e., 1), which is generated based on a number (i.e., 1) of occurrences of security events, in the security keyboard call signal. Further, the fake caller module 106 may include an ID of the second caller module 102-2, which is caller identification information, in the security keyboard call signal.

Then, the security keyboard module 104 extracts the caller identification information included in the security keyboard call signal, and extracts a number of security keyboard calls corresponding to the extracted caller identification information. In this case, the number of security keyboard calls made by the second caller module 102-2 is 3, such that the security keyboard module 104 generates, as a second verification value, a value (i.e., 4) which is increased by 1 from the number of security keyboard calls. Since the first verification value (i.e., 1) and the second verification value (i.e., 4) are not equal, the security keyboard module 104 determines that verification of a security keyboard call fails.

As described above with reference to the embodiments, a malicious attempt to call a security keyboard by counterfeiting a legitimate caller module may be prevented. Furthermore, even if a malicious third party exactly duplicates a legitimate caller module and knows an algorithm for generating a verification value, the malicious third party may not pass a verification process of a security keyboard call without knowledge of an actual number of call events made by a legitimate caller (i.e., the first caller module 102-1 and the second caller module 102-2).

Figure 4:
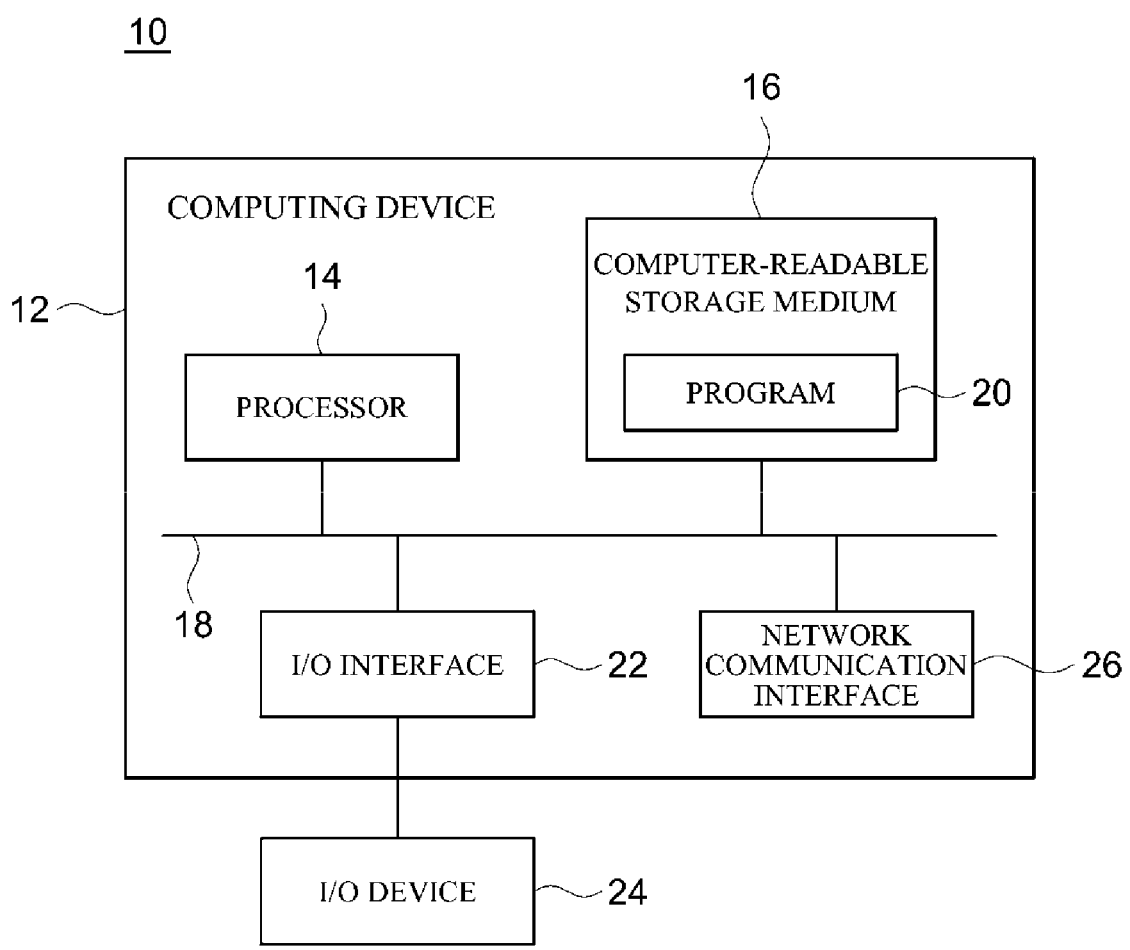
FIG. 4 is a block diagram explaining an example of a computing environment which includes a computing device suitable for use in exemplary embodiments.

FIG. 4 is a block diagram explaining an example of a computing environment 10 which includes a computing device suitable for use in exemplary embodiments. In the illustrated embodiment, each component may include functions and capabilities different from those described below, and may further include components in addition to those described below.

The computing environment 10 includes a computing device 12. In one embodiment, the computing device 12 may be a security keyboard system (e.g., security keyboard system 100). Further, the computing device 12 may be a computing device which includes a module (e.g., caller module 102) for calling a security keyboard. In addition, the computing device 12 may include a module (e.g., security keyboard module 104) for providing a security keyboard in response to a security keyboard call.

The computing device 12 includes at least one processor 14, a computer-readable storage medium 16, and a communication bus 18. The processor 14 may control the computing device 12 to operate according to the above-described exemplary embodiments. For example, the processor 14 may execute one or more programs stored on the computer-readable storage medium 16. The one or more programs may include one or more computer-executable instructions, which when being executed by the processor 14, may cause the computing device 12 to perform operations according to the exemplary embodiments.

The computer-readable storage medium 16 stores computer-executable instructions, program codes, program data, and/or other suitable types of information. The programs 20 stored on the computer-readable storage medium 16 may include a combination of instructions which may be executed by the processor 14. In one embodiment, the computer-readable storage medium 16 may be a memory (volatile and non-volatile memory such as a random access memory, or a suitable combination thereof), one or more magnetic disc storage devices, optical disk storage devices, flash memory devices, and other types of storage media that are accessed by the computing device 12 and may store desired information, or a suitable combination thereof.

The communication bus 18 interconnects various components of the computing device 12 including the processor 14 and the computer-readable storage medium 16.

The computing device 12 may further include one or more input/output (I/O) interfaces 22 to provide interfaces for one or more I/O devices 24, and one or more network communication interfaces 26. The I/O interface 22 and the network communication interface 26 are connected to the communication bus 18. The I/O device 24 may be connected to other components of the computing device 12 through the I/O interface 22. The exemplary I/O device 24 may include a pointing device (e.g., mouse, trackpad, etc.), a keyboard, a touch input device (e.g., touch pad, touch screen, etc.), a voice input device, a sound input device, input devices such as various types of sensor devices and/or photographing devices, and/or output devices such as a display device, a printer, a speaker, and/or a network card. The exemplary I/O device 24 may be included in the computing device 12 as a component of the computing device 12, or may be connected to the computing device 12 as a separate device from the computing device 12.

In the embodiments of the present disclosure, a caller module includes a verification value in a security keyboard call signal, and verifies a security keyboard call by comparing a verification value generated by a security keyboard module with the verification value included in the security keyboard call signal. In this manner, a security keyboard may be provided by only responding to a call made by a legitimate caller module registered in a security keyboard system, thereby protecting a user's private information, input via a security keyboard, from hackers or a third party who attempts to steal the information for malicious purposes, and thus improving security when the security keyboard is used.

Although representative embodiments of the present disclosure have been described in detail, it should be understood by those skilled in the art that various modifications to the aforementioned embodiments can be made without departing from the spirit and scope of the present disclosure. Thus, the scope of the present disclosure is not intended to be limited to the described embodiments, but should be defined by the appended claims and their equivalents.

What is claimed is:

1. A security keyboard system, comprising:
one or more hardware processors configured to implement:
 a caller module configured to:
  generate a first verification value in response to a call event for a security keyboard, and
  generate a security keyboard call signal which includes the first verification value and caller identification information; and
 a security keyboard module configured to:
  receive the security keyboard call signal,
  generate a second verification value based on the security keyboard call signal, and
  verify a security keyboard call by comparing the first verification value and the second verification value,
wherein the caller module is further configured to generate a one-time encryption key used for the call event when the call event occurs, and insert the one-time encryption key in the security keyboard call signal, and wherein the security keyboard module is further configured to, in response to a successful verification of the security keyboard call:
  generate the security keyboard,
  encrypt the security keyboard by using the one-time encryption key, and
  transmit the encrypted security keyboard to the caller module.

2. The security keyboard system of claim 1, wherein the caller module and the security keyboard module are further configured to respectively generate the first verification value and the second verification value according to an algorithm mutually agreed upon between the caller module and the security keyboard module.

3. The security keyboard system of claim 2, wherein the first verification value is generated differently every time the call event occurs, and is generated based on a previous first verification value generated based on a preceding call event, and
  wherein the second verification value is generated differently every time the security keyboard call occurs, and is generated based on a previous second verification value generated based on a preceding security keyboard call.

4. The security keyboard system of claim 1, wherein the caller module is further configured to generate the first verification value based on a first count of occurrences of the call event, and
  wherein the security keyboard module is further configured to generate the second verification value based on a second count of occurrences of the security keyboard call.

5. The security keyboard system of claim 1, wherein the caller module is further configured to insert a first hash value of the first verification value in the security keyboard call signal and
  wherein the security keyboard module is further configured to generate a second hash value of the second verification value, and verify the security keyboard call by comparing the first hash value and the second hash value.

6. A security keyboard executing method performed by a computing device which comprises at least one processor, and a memory which stores at least one program executed by the at least one processor, the method comprising:
  determining whether a call event for a security keyboard has occurred;
  in response to the call event, generating a first verification value according to a predetermined algorithm;
  generating a security keyboard call signal which includes the first verification value, caller identification information and a one-time encryption key used for the call event when the call event occurs;
  generating a second verification value based on the security keyboard call signal;
  verifying the security keyboard call by comparing the first verification value and the second verification value;
  in response to a successful verification of the security keyboard call, generating the security keyboard;
  encrypting the security keyboard by using the one-time encryption key; and
  transmitting the encrypted security keyboard in response to the security keyboard call signal,
  wherein the first verification value is for verifying a security keyboard call.

7. The security keyboard executing method of claim 6, wherein the first verification value is generated differently every time the call event occurs, and is generated based on a previous first verification value generated based on a preceding call event, and
  wherein the second verification value is generated differently every time the security keyboard call occurs, and is generated based on a previous second verification value generated based on a preceding security keyboard call.

8. The security keyboard executing method of claim 6, wherein the first verification value is generated based on a first count of occurrences of the call event, and
  wherein the second verification value is generated based on a second count of occurrences of the security keyboard call.

9. The security keyboard executing method of claim 6, wherein the generating the first verification value comprises generating a first hash value of the first verification value, the first hash value of the first verification value being included in the security keyboard call signal, and
  wherein the verifying the security keyboard call comprises generating a second hash value of the second verification value, and verifying the security keyboard call by comparing the first hash value and the second hash value.

10. A security keyboard executing method performed by a computing device which comprises at least one processor, and a memory which stores at least one program executed by the at least one processor, the method comprising:
  receiving a security keyboard call signal which includes a first verification value generated in response to a call event for a security keyboard, and caller identification information;
  generating a second verification value based on the security keyboard call signal; and
  verifying a security keyboard call by comparing the first verification value and the second verification value,
  wherein the security keyboard call signal includes a one-time encryption key used for the call event when the call event occurs, and
  wherein the method further comprises:
  in response to a successful verification of the security keyboard call, generating the security keyboard,
  encrypting the security keyboard by using the one-time encryption key, and
  transmitting the encrypted security keyboard in response to the security keyboard call signal.

11. The security keyboard executing method of claim 10, wherein the first verification value is generated differently every time the call event occurs, and is generated based on a previous first verification value generated based on a preceding call event, and
  wherein the second verification value is generated differently every time the security keyboard call occurs, and is generated based on a previous second verification value generated based on a preceding security keyboard call.

12. The security keyboard executing method of claim 10, wherein the first verification value is generated based on a first count of occurrences of the call event, and
  wherein the second verification value is generated based on a second count of occurrences of the security keyboard call.

13. The security keyboard executing method of claim 10, wherein the security keyboard call signal includes a first hash value of the first verification value, and
  wherein the verifying the security keyboard call comprises generating a second hash value of the second verification value, and verifying the security keyboard call by comparing the first hash value and the second hash value.

14. A computing device comprising:
at least one processor;
a memory; and
at least one program stored in the memory and executed by the at least one processor,
wherein the at least one program comprises:
a verification value generator configured to generate a first verification value in response to a call event for a security keyboard;
a caller configured to generate a security keyboard call signal which includes the first verification value and caller identification information; and
an encryption key generator configured to generate a one-time encryption key used for the call event when the call event occurs,
wherein the first verification value is for verifying a security keyboard call, and
wherein the caller is further configured to insert the one-time encryption key in the security keyboard call signal.

15. The computing device of claim 14, wherein the verification value generator is further configured to generate the first verification value differently every time the call event occurs, and generate the first verification value based on a previous first verification value generated based on a preceding call event.

16. The computing device of claim 14, wherein the verification value generator is further configured to generate the first verification value based on a count of occurrences of the call event.

17. A computing device, comprising:
at least one processor;
a memory; and
at least one program stored in the memory and is executed by the at least one processor,
wherein the at least one program comprises:
a call verifier configured to:
receive a security keyboard call signal which includes (i) a first verification value generated in response to a call event for a security keyboard, and (ii) caller identification information,
generate a second verification value based on the security keyboard call signal, and
verify a security keyboard call by comparing the first verification value and the second verification value; and
a security keyboard generator configured to, in response to a successful verification of the security keyboard call, generate the security keyboard and transmit the security keyboard to a transmitter of the security keyboard call signal,
wherein the security keyboard call signal includes a one-time encryption key used for the call event when the call event occurs, and
wherein the security keyboard generator is further configured to encrypt the security keyboard by using the one-time encryption key, and transmit the encrypted security keyboard to the transmitter of the security keyboard call signal.

18. The computing device of claim 17, wherein the first verification value is generated differently every time the call event occurs, and is generated based on a previous first verification value generated based on a preceding call event, and
wherein the second verification value is generated differently every time the security keyboard call occurs, and is generated based on a previous second verification value generated based on a preceding security keyboard call.

19. The computing device of claim 17, wherein the first verification value is generated based on a first count of occurrences of the call event, and
wherein the second verification value is generated based on a second count of the security keyboard call.

20. The computing device of claim 17, wherein the security keyboard call signal includes a first hash value of the first verification value, and
wherein the call verifier is further configured to generate a second hash value of the second verification value, and verify the security keyboard call by comparing the first hash value and the second hash value.

* * * * *